United States Patent
Okochi et al.

(10) Patent No.: US 6,348,282 B1
(45) Date of Patent: *Feb. 19, 2002

(54) NON-AQUEOUS ELECTROLYTE SECONDARY BATTERIES

(75) Inventors: Masaya Okochi, Osaka; Masaki Kitagawa, Katano; Takashi Takeuchi, Kadoma; Kaoru Inoue, Moriguchi; Hizuru Koshina, Neyagawa, all of (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/973,026
(22) PCT Filed: Mar. 27, 1997
(86) PCT No.: PCT/JP97/01040
  § 371 Date: Feb. 18, 1998
  § 102(e) Date: Feb. 18, 1998
(87) PCT Pub. No.: WO97/36338
  PCT Pub. Date: Oct. 2, 1997

(30) Foreign Application Priority Data

Mar. 28, 1996 (JP) .............................................. 8-073529

(51) Int. Cl.⁷ .............................................. H01M 10/40
(52) U.S. Cl. ........................... 429/94; 429/233; 429/324
(58) Field of Search ........................... 429/94, 324, 233

(56) References Cited

U.S. PATENT DOCUMENTS

| | | | |
|---|---|---|---|
| 4,375,501 A | * 3/1983 | Peled et al. .................... | 429/94 |
| 4,385,101 A | 5/1983 | Catanzarite | |
| 4,622,277 A | 11/1986 | Bedder et al. | |
| 4,664,989 A | * 5/1987 | Johnson ........................ | 429/94 |
| 4,937,154 A | * 6/1990 | Moses et al. .................. | 429/94 |
| 5,008,165 A | * 4/1991 | Schmode ...................... | 429/94 |
| 5,322,746 A | 6/1994 | Wainwright | |

FOREIGN PATENT DOCUMENTS

| | | |
|---|---|---|
| EP | 0 655 793 | 5/1995 |
| GB | 2 225 153 | 5/1990 |
| JP | 2-51875 | 2/1990 |
| JP | 05234620 | 9/1993 |
| JP | 5-234620 | 9/1993 |
| JP | 07320770 | 12/1995 |
| JP | 8-153542 | 6/1996 |
| WO | WO96/10273 | 4/1996 |

OTHER PUBLICATIONS

International Search Report for Int'l Appln. No. PCT/JP97/01040 dated Jul. 10, 1997.

* cited by examiner

*Primary Examiner*—John S. Maples
(74) *Attorney, Agent, or Firm*—Ratner & Prestia, P.C.

(57) ABSTRACT

A non-aqueous secondary battery having an electrode group comprising a portion of exposed metal foil electrically connected to the positive electrode collector and covering the entire outer surface of the electrode group. Separator material is sandwiched between the foil and the negative electrode, which is positioned outwardly of the positive electrode, and separator material is also positioned between the foil covering of the electrode group and a negative polarity cell container. The positioning of the metal foil is such that if the battery is crushed, the separator material on the outermost side of the metal foil or between the metal foil and the negative electrode is broken first, so that the metal foil short-circuits with the inner wall of the cell container or the negative electrode, respectively.

7 Claims, 4 Drawing Sheets

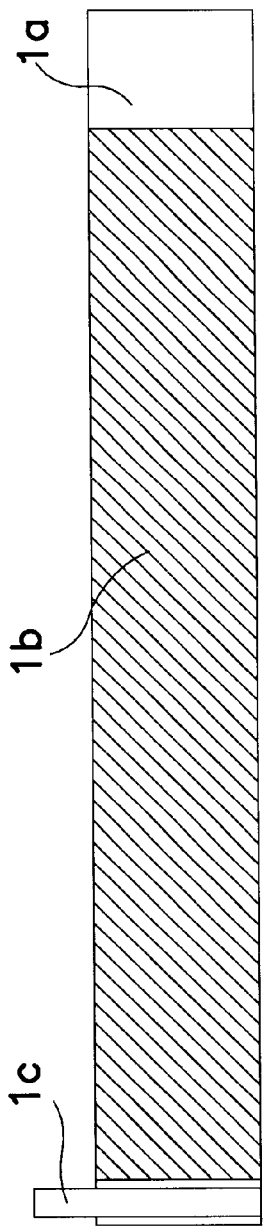
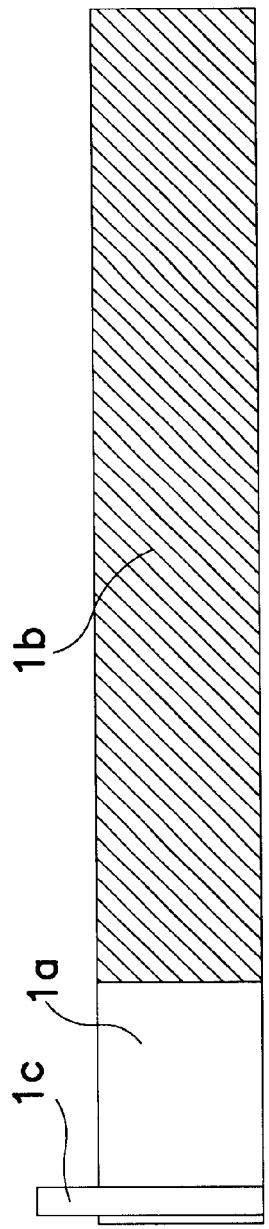
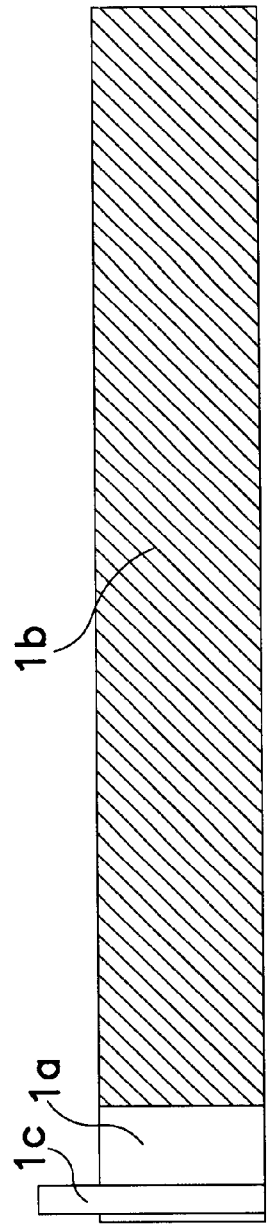

NON-AQUEOUS ELECTROLYTE SECONDARY BATTERIES

This application is a U.S. National phase application of PCT INTERNATIONAL APPLICATION PCT/JP97/01040.

TECHNICAL FIELD

The present invention relates to a non-aqueous electrolyte secondary battery having an electrode group composed of a thin positive electrode and a thin negative electrode with separator material sandwiched therebetween, and more particularly to its safety.

BACKGROUND ART

Conventionally, non-aqueous electrolyte secondary batteries use a chalcogenide, such as an oxide, sulfide or selenide of a transition metal as positive active material. For example, manganese dioxide, molybdenum disulfide, titanium selenide, or metal lithium sheet is used as a negative active material. An organic electrolyte composed of an organic solvent solution of lithium salt is typically used as a non-aqueous electrolyte. Such batteries are typically referred to as lithium secondary batteries, and are aimed at producing batteries of high voltage, large capacity, and high energy density. In such lithium secondary batteries, however, although an intercalation compound having excellent charging and discharging characteristics may have been selected as the positive active material, the charging and discharging characteristics of the negative electrode was not always excellent, and it was difficult to assure a long cycle life. Furthermore, accidents such as fire and rupture due to an internal short circuit were likely to occur, raising serious safety concerns.

The metal lithium in the negative active material in this battery is dissolved as lithium ions in the organic electrolyte due to discharge. When charging, the dissolved lithium ions deposit on the surface of the negative electrode as metal lithium, but all of them do not deposit smoothly as in the initial state. Some of them deposit as dendrites or mossy, active, metallic crystals. Such active metallic crystals react with the organic solvent in the electrolyte, causing their surface to be covered with a passivation film, making them inactive and unable to contribute to discharge. Therefore, the negative electrode capacity drops as the charging and discharging cycles are repeated. Accordingly, when manufacturing the cells, it was necessary to set the negative electrode capacity extremely larger than that of the positive electrode. Besides, active lithium metallic crystals are likely to form an internal short circuit by penetrating through the separator and contacting with the positive electrode. By such an internal short circuit, the cell may suddenly generate hear, causing a cell rupture or accidental fire.

Accordingly, the so-called lithium ion secondary batteries using a material for intercalating and deintercalating lithium ions by charging and discharging as the negative material have been proposed, intensively researched and developed globally, and are now already in a practical stage. The lithium ion secondary battery, as long as it is not overcharged, does not deposit active metallic lithium crystals on the negative electrode surface when charging, and enhancing safety. Its demand is growing rapidly in recent years because it is superior to the conventional lithium secondary battery in high-rate charge and discharge characteristics and life cycle. In the lithium ion secondary battery, lithium is the active material, and thus, the battery may be regarded as a kind of lithium secondary battery. It can be distinguished, however, from the lithium secondary battery that uses conventional metallic lithium as the negative electrode.

As the positive active material of the lithium ion secondary battery, a double oxide of lithium and a transition metal, such as $LiCoO_2$, $LiNiO_2$, $LiMnO_2$, or $LiMn_2O_4$ in discharged state, is used. As the negative active material, graphite or other carbon material similar in potential to the metallic lithium as charged is used in most systems, but in other systems of low voltage operation, in part, a double oxide of lithium and transition metal is used in the negative electrode.

When the lithium ion secondary battery is charged and discharged, the positive active material can reversibly repeat deintercalation and intercalation of lithium ions, and the negative active material can reversibly repeat intercalation and deintercalation of lithium ions, so that the cycle life is extremely long. Moreover, because of high voltage and/or large capacity, a battery of high energy density is provided.

However, these lithium ion secondary batteries, like the conventional lithium secondary batteries, employ organic electrolytes of relatively low ionic conductivity. Accordingly, a thin positive electrode and negative electrode are fabricated by thinly forming an active material layer or a mixture layer of active material and conductive agent on a metal foil of current collector. An electrode group is composed by setting the positive electrode and negative electrode oppositely to each other separated by a thin microporous polyolefin resin membrane separator. By increasing the opposing surface areas of the positive electrode and negative electrode, a practical high-rate charge and discharge characteristic is maintained to expand conformity to many applications. For example, the positive electrode and negative electrode, each piece in a thin and long strip form sandwiching a separator therebetween, may be spirally wound or plaited like an accordion, or a plurality of positive electrodes and negative electrodes may be laminated alternately with a separator therebetween to form the electrode group.

In these lithium ion secondary batteries, a separator capable of closing fine pores and thus decreasing the ion conductivity when raised to a specified temperature is used to cut off current. Moreover, an electronic protection circuit in the battery pack is used to control each cell to prevent fatal deterioration due to overcharge and overdischarge. Therefore, when used normally, safety is assured, but in abnormal use, it is hard to guarantee safety. For example, when a battery pack in a fully charged state is crushed by a strong external force, such as being run over by an automobile, or when overcharged due to malfunction of the protection circuit as described above, the separator in the cell may be broken, and the positive and negative electrodes are shorted. Such shorted electrodes generate heat by Joule heat or reaction heat, and when the decomposition temperature of the positive active material is achieved, active oxygen is generated. The active oxygen violently oxidizes the solvent in the organic electrolyte or the other material in the cell, causing a state of thermal runaway. As a result, the cell temperature rises sharply in an instant, possibly leading to cell rupture or accidental fire. The risk of such accident is also present when the charged battery pack is disposed of with common household refuse.

To prevent such accidents, usually, in each cell, a temperature fuse, PTC device, other temperature rise preventive means, and an explosion-proof safety valve are provided, but may not be sufficient to cope with the sudden temperature rise due to a thermal runaway. It was therefore proposed to provide a cell capable of preventing a sudden rise in cell temperature, thus preventing cell rupture and accidental fire as experienced hitherto when the positive electrode and negative electrode are short-circuited, such as when the separator is broken due to the cell being crushed or overcharged. A typical example is disclosed in Japanese Laid-open Patent Application No. Hei8-153542, relating to a laminate electrode assembly (electrode group) comprising a positive electrode and a negative electrode, each comprising an active material layer at least on one side of a metal foil which is a collector, positioned opposite to each other with a separator therebetween. The confronting portions of the metal foils of the collector of the positive electrode and the negative electrode are exposed at least on one side, over at least one turn or one layer or more, with the separator therebetween, in any one of the electrode group outermost portion, innermost portion, or intermediate portion.

In such cell a composition, when the side surface is pressed, the cell is crushed, the separator is torn, and the positive electrode and negative electrode contact each other, the short-circuit current flows selectively between the exposed metal foil portions of the collector of the positive electrode and the negative electrode, which are higher in electronic conductivity than the active material layer, and the positive and negative active materials in a charged state are discharged and consumed in a short time, so that the cell temperature may not be raised to a critical state. Moreover, in order to short-circuit securely between exposed portions of the metal foil of the positive and negative electrode collectors, this same publication also discloses means for selectively tearing the separator between the exposed portions of the positive and negative metal foils by interposing a part made of a rigid or elastic body at least in one of the exposed portions of the positive and negative electrode metal foils.

As a result of close studies of these proposed cell compositions, the present invention proposes a cell composition having an electrode group for selectively short-circuiting in a position of high electronic conductivity between the metal foil of the positive electrode collector and the negative electrode, easily releasing heat in the cell without sacrificing the cell capacity or increasing the number of parts more than necessary. By employing such a cell composition, it is intended to present a non-aqueous secondary battery high in reliability and enhanced in safety, capable of securely preventing accidents such as rupture or fire, even in the event of the abnormality of crushing the cell.

DISCLOSURE OF INVENTION

The invention relates to a non-aqueous electrolyte secondary battery comprising an electrode group composed by sandwiching a separator between a thin positive electrode and a thin negative electrode. Each electrode comprises a metal foil, which is a collector, having a thin coating thereon, the coating comprising an active material layer or a mixture layer of active material and conductive agent. The electrode group is configured such that the negative electrode is positioned outwardly relative to the positive electrode, and a portion of exposed metal foil, which is electrically connected to the positive electrode and has no active material layer or no mixture layer of active material and conductive agent thereon, covers the outer side of the negative electrode with a separator therebetween. The outermost side of the exposed metal foil is also covered with a separator. The electrode group so constructed is put in a negative polarity cell container together with non-aqueous electrolyte. Thus, the exposed metal foil connected to the positive electrode collector covers the entire surface of the outer side of the electrode group, having one side facing the negative electrode and the other side facing the inner side wall of the negative polarity cell container. Therefore, if the cell side surface is pushed by a strong external force and the cell is crushed, the separator on one side or both sides of the metal foil of the positive electrode collector positioned outside of the electrode group is first broken, and the metal foil for the positive electrode short-circuits with a least one of the negative electrode and the inner wall of the negative polarity cell container. The positive and negative materials in a charged state are thus discharged and consumed in a short time, and because the short-circuit position is adjacent to the cell container, the heat is released easily, thereby preventing a sudden rise in cell temperature. As a result, cell rupture, fire or other accidents may be prevented, so that the reliability and safety are successfully enhanced without increasing the number of parts or sacrificing the cell capacity more than necessary.

BRIEF DESCRIPTION OF DRAWINGS

FIG. 3 show comparative examples 1, 2, 3 of the positive electrode for cylindrical cell.

BEST MODE FOR CARRYING OUT THE INVENTION

Figure 1:
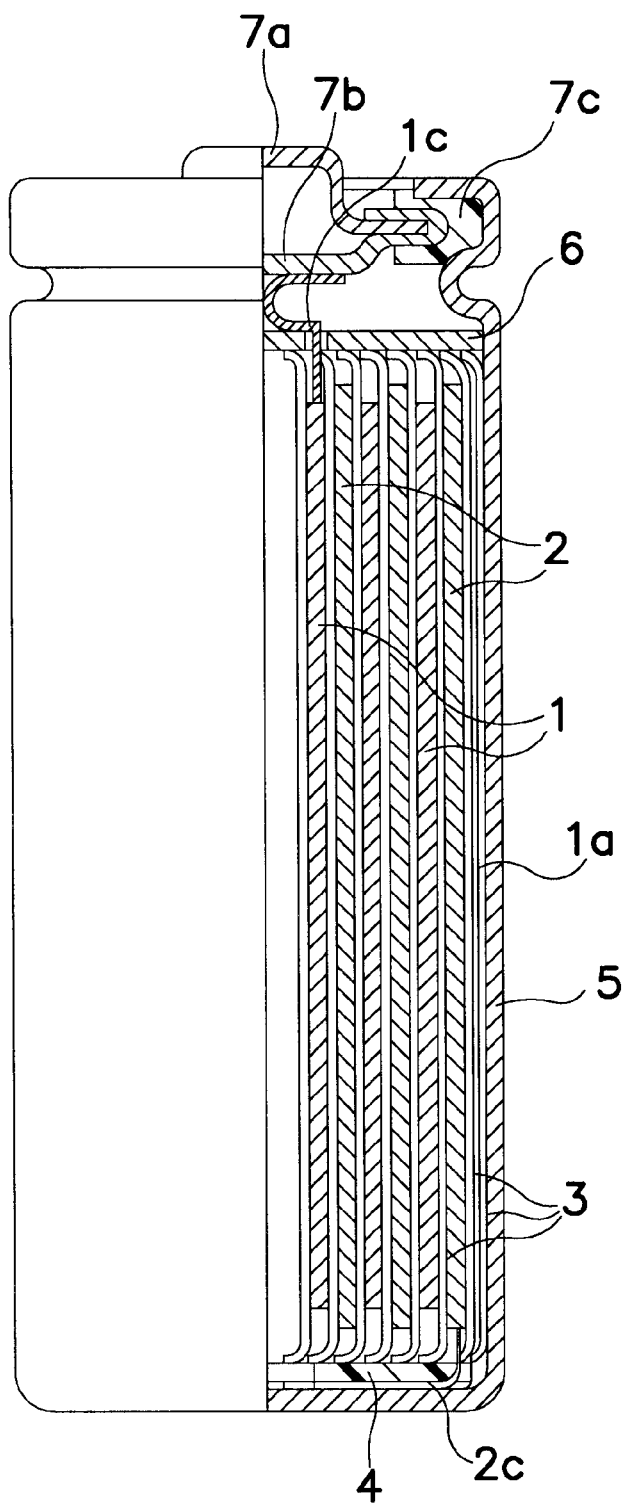
FIG. 1 is a sectional view of a cylindrical non-aqueous electrolyte secondary battery according to an embodiment of the invention.

Referring now to the drawings and table below, a preferred embodiment of the invention is described specifically below.

FIG. 1 is a sectional view of a lithium ion secondary cylindrical cell (overall height 70 mm, diameter 20 mm) in an embodiment of a non-aqueous secondary battery of the invention.

FIG. 1, an electrode group is constructed by spirally winding a positive electrode 1 of 57 mm in width and 520 mm in length, and a negative electrode 2 of 59 mm in width, 550 mm in length, and 0.2 mm in thickness, with a separator 3 therebetween. The separator is made of a microporous polypropylene membrane.

Figure 2:
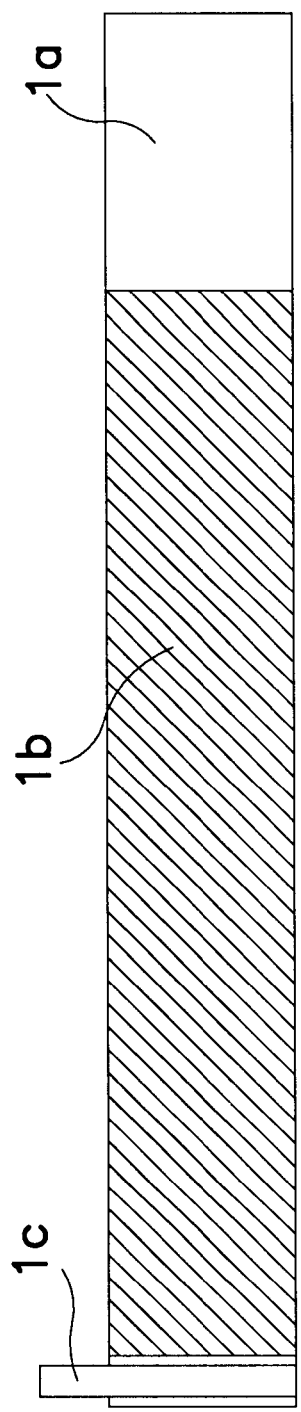
FIG. 2 shows the positive electrode having exposed surfaces on both sides of the metal foil of the collector over a sufficient length for covering at least the outermost periphery of the electrode group in a cylindrical cell in an embodiment of the invention.

The positive electrode 1 is fabricated by first preparing a positive electrode paste by adding and mixing an artificial graphite as a conductive agent to an active material made of a double oxide ($LiCoO_2$) of lithium and cobalt prepared by baking a mixture of lithium carbonate ($Li_2CO_3$) and cobaltocobaltic oxide ($Co_3O_4$) in air at 900° C. A 5 wt. % dispersion solution of polytetrafluoroethylene (PTFE) is added and mixed into the paste as a binder. Both sides of an aluminum (Al) foil 1a are coated with this positive electrode paste, dried, and pressed by rolling, forming a mixture layer 1b of active material and conductive agent. According to the invention, a 57 mm portion of positive electrode 1 (corresponding to the length of at least one periphery of the outer circumference of the spiral electrode group) has the Al foil of the collector exposed without any mixture layer of the active material and conductive agent on either side, as shown in FIG. 2.

The portion of foil 1a coated with mixture layer 1b may be considered a "first foil portion" whereas the exposed portion of foil 1a may be considered a "second foil portion" that is electrically connected the first foil portion. As shown in FIGS. 2 and 3, the first and second foil portions may merely comprise portions of a single foil. A positive electrode lead piece 1c is spot-welded to another exposed portion of Al foil at the end of the positive electrode opposite Al foil exposed portion 1a.

The negative electrode 2 is fabricated by mixing 5 wt. % of styrene-butadiene rubber as a binder to the active material, which comprises artificial graphite powder with an average particle size of 3 μm. This negative electrode paste is then dispersed in carboxymethyl cellulose (CMC) aqueous solution and applied to both sides of the copper (Cu) foil of the collector. The paste is then dried, and the electrode is pressed by rolling, and cut. A negative electrode lead piece 2c is spot welded to an exposed portion of Cu foil at one end of the cut negative electrode 2.

The electrode group is then spirally wound, starting with separator 3 at the winding core, and ending with at least one turn of the exposed portion 1a of the positive electrode 1 covering the negative electrode 2, which is on the outer circumference. Separator 3 is sandwiched between exposed foil portion 1a and negative electrode 2 and also covers the outermost circumference of the exposed foil. The outside diameter of the electrode group was 18 mm.

Afterwards, the upper surface and lower surface of the electrode group are heated by hot air, and any portions of the separators 3 extending past the upper end and lower end of the electrode group are shrunk. A bottom insulating plate 4 is fitted and put in a cell container 5, and a negative electrode lead piece 2c is spot welded to the inner bottom surface of the cell container 5. An upper insulating plate 6 is mounted on the electrode group, a groove is cut in a specified position of the opening of the cell container 5, and a proper amount of non-aqueous electrolyte is poured in. The non-aqueous electrolyte comprises 1 mole of lithium hexafluorophosphate ($LiPF_6$) dissolved in a mixed solvent of ethylene carbonate (EC) and diethyl carbonate (DEC) at volume ratio of 1:1. 1 liter of organic electrolyte was prepared. Later, a terminal plate 7a and a cover plate 7b are crimped into one body, a gasket 7c is fitted in the peripheral edge, and a positive electrode lead piece 1c is spot welded to the cover plate 7b of the lower side of this assembled cover. The assembled cover is fitted into the opening of the cell container 5, and the upper edge of the cell container 5 is curved inward to seal. This embodiment is listed as cell A in the table below.

FIGS. 3A, B and C show comparative examples 1, 2 and 3 fabricated for confirming the effect of the invention.

In comparative example 1, the length of the exposed portion of the Al foil of positive electrode is 30 mm long, as compared with the length of 57 mm in the exposed portion of the Al foil of the positive electrode of the invention. When the electrode group is composed by using the positive electrode of the comparative example 1, the entire outer circumference of the electrode cannot be covered with the exposed portion of Al foil.

In comparative example 2, the positive electrode has an exposed portion of Al foil over a length of 57 mm at the winding core side of the electrode group to which the positive electrode lead piece 1c is welded.

In comparative example 3, the positive electrode is 30 mm long in the exposed portion of the Al foil at the winding core side.

Figure 4:
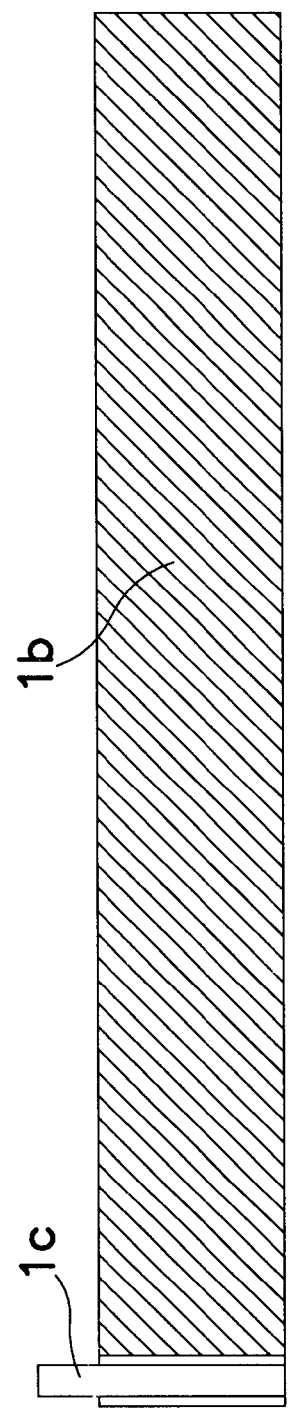
FIG. 4 shows a prior art of positive electrode for cylindrical cell.

In the prior art shown in FIG. 4, there is no exposed portion of Al foil, unlike the positive electrodes in the invention and in the comparative examples.

Using the positive electrodes of comparative examples 1, 2, 3 and prior art, cells were fabricated by constructing the rest of the electrode group and the rest of the cell in same manner as cell A, with all the same other parts, materials and methods. These cells are respectively called B, C, D and E.

50 cells each of the fabricated cells A, B, C, D and E were charged for 2.0 hours at 20° C., at constant current of 800 mA and constant voltage of 4.2V per cell. All charged cells were presented for a crushing test, and the number of cells breaking out in fire was counted. The results are summarized in Table 1. In the crushing test, a cylindrical metal rod of 10 mm in diameter of steel or the like was placed so as to be vertical to the cell axial line, at the cell outer wall side of the middle of the overall height of each cell, and the cell was pressed and crushed by a pressing machine until the diameter became half the diameter prior to crushing.

TABLE 1

| Cell | Positive electrode | Number of cells breaking out in fire |
|---|---|---|
| A | Invention | 0/50 |
| B | Comparative example 1 | 3/50 |
| C | Comparative example 2 | 4/50 |
| D | Comparative example 3 | 3/50 |
| E | Prior art | 7/50 |

As is clear from the results in Table 1, fire took place in 7 of cells E of the prior art, while no fire was caused in cells A of the invention. In cells B, C and D using the positive electrodes having exposed portions of Al foil in the outer circumference or winding core portion of the electrode group, the number of cells breaking out fire was about half that of cells E, but was not zero.

In cell A of the invention, as mentioned above, the entire outer circumference of the electrode group is wound at least one turn in metal foil that conducts electrically with the positive electrode, with separator on either side of the metal foil. In other words, the metal foil for the positive electrode is wound at least one turn around the outer circumference of the electrode group, with one side facing the negative electrode, with separator therebetween, and the other side facing the inner wall of the negative polarity cell container, with separator therebetween. When the cell is crushed in this state, first the separator closer to the outer side in the cell is torn, and the metal foil of the positive electrode collector selectively short-circuits with at least one of the cell container or the negative electrode of the outermost circumference. As mentioned above, since the outer circumference of the electrode group is covered by at least one turn of the exposed metal foil conducting electrically to the positive electrode, if any position of the cell side surface is crushed by pressing, short-circuit occurs as stated above, and no fire results in the cell.

By contrast, in the cell B, as mentioned above, since the entire outer circumference of the electrode group is not covered with the exposed portion of the Al foil of the positive electrode, the metal rod used in the crushing test may not always press the exposed portion of the Al foil. This explains why fires cannot be completely eliminated in the cell B.

In the cells having the exposed portion of Al foil of the positive electrode collector at the winding core side of the electrode group, as in the cells C and D, the separator adjacent the exposed portion of the metal foil is not always torn. When the positive and negative active materials contact directly with each other due to breakage of separator, thermal runaway may occur in certain cells. The electrode group compositions in C and D are advantageous in that the cell capacity is hardly sacrificed, as disclosed in Japanese Laid-open Patent Application No. Hei8-153542, but accidental cell fires cannot be eliminated completely, which is a problem in the aspect of reliability. The same publication proposed separator breakage parts made of metal bars inserted into the winding core. These cells were evaluated in a crushing test, and it was confirmed that the cell fires could be nearly eliminated. In such cell compositions, however, since the number of parts increases, the cell manufacturing cost and weight are increased, and hence it is not an optimal solution.

As mentioned above, according to the proposal disclosed in Japanese Laid-open Patent Publication Application Hei8-153542, the cell is constructed by disposing the confronting portions of the metal foils of the positive electrode and negative electrode collectors, having at least one side exposed and separator therebetween, over a length of one turn or one layer, in any one of the outermost side, innermost side, and the intermediate portion of the electrode group. In the present invention, the exposed portion of metal foil is only on the positive electrode, the entire outer surface of the electrode group has the negative electrode positioned at the outer side and covered with the exposed metal foil portion of the positive electrode with separator therebetween, the outermost side of the foil is wrapped with separator, and the electrode group is put in a negative polarity cell container. In the present invention, the exposed portion is not provided in the metal foil of the negative electrode collector because the active material in the charged state of the lithium ion secondary battery and lithium secondary battery is highly conductive. For example, the carbon material in which the lithium is inserted, expressed as C6Li, and the metallic lithium are both highly conductive. If short-circuited, an active oxygen generation source is not obtained unless there is direct contact with the positive active material. Therefore, in the cell composition of the invention, the capacity of negative electrode or cell is not sacrificed. It is a benefit of the invention that the entire outer surface of the electrode group is covered with a very thin metal foil connected to the positive electrode collector and with a separator. In such cell composition, the cell capacity is slightly sacrificed, but the higher reliability in cell crushing and improved safety are considered more important.

Figure 5:
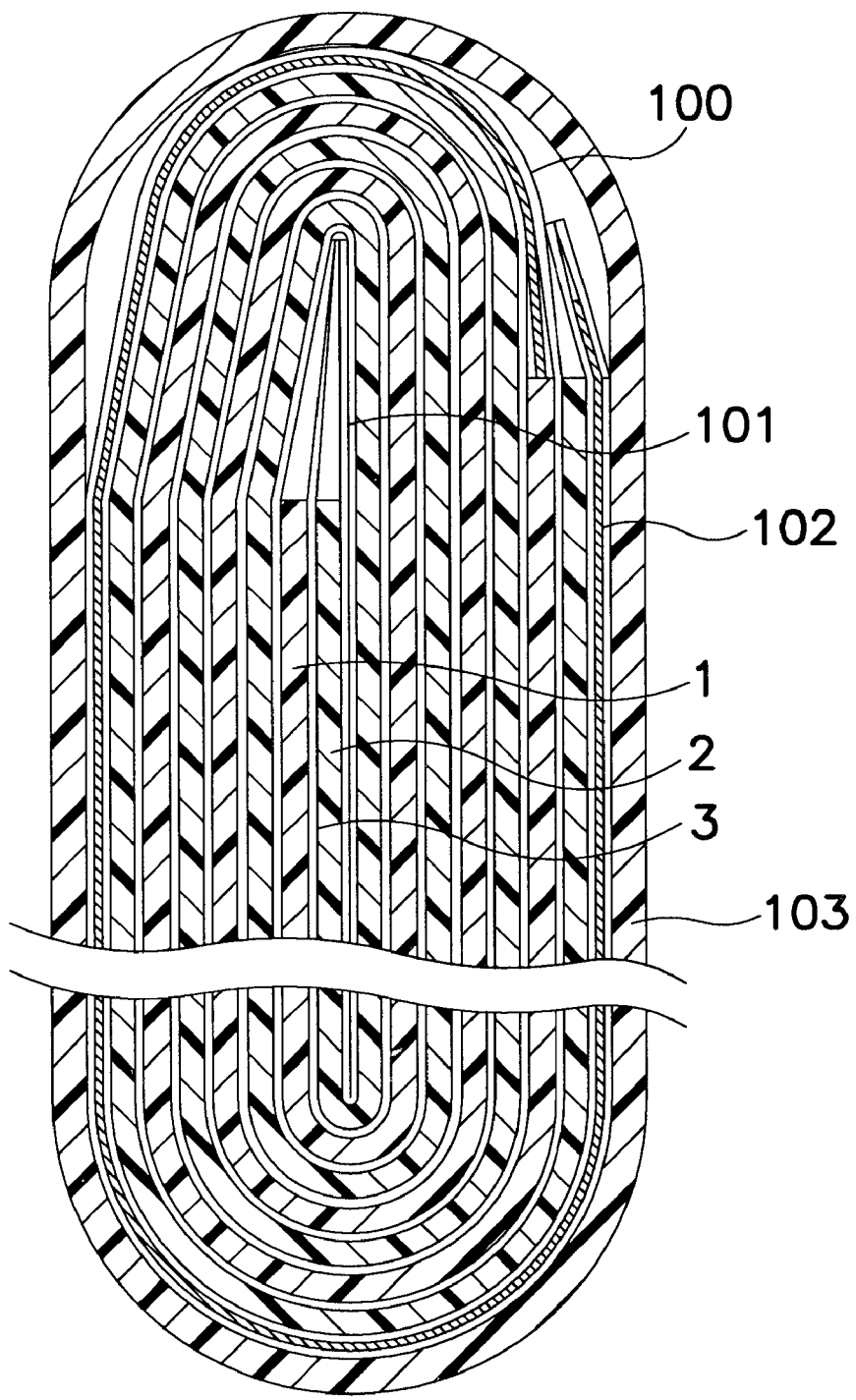
FIG. 5 shows a cross-sectional diagram of an exemplary oval-shaped cell of the present invention.

So far, a cylindrical cell has been described as the embodiment. The invention, however, is not limited to the cylindrical cell alone. It may also be applied to an oval cell using an oval section electrode group. Such an oval section electrode group is formed using a thin and long positive electrode and a thin and long negative electrode configured in a flat plate in the winding core portion with a separator therebetween, and then plaiting down in one direction and winding up, An exemplary oval cell, as shown in cross-section in FIG. 5, comprises electrode group 100 comprising positive electrode 1, negative electrode 2, and separator material 3 therebetween. Central winding core 101 is configured in the shape of a flat plate. Exposed metal foil portion 1*a* (also expressed as "the second metal foil") is electrically connected to outer circumferential end 102 of positive electrode 1 (also expressed as "the first metal foil," which is the portion of foil 1*a* covered by mixture layer 1*b*). Negative polarity cell container 103 has an oval geometry.

The oval cell is also similar to a prismatic cell using an electrode group made by plaiting down a thin and long positive electrode and thin and long negative electrode in an accordion form with a separator therebetween, or a prismatic cell using an electrode group comprising a plurality of positive electrodes and negative electrodes alternately laminated with separators therebetween. Of the cells of these shapes, however, such as in the prismatic cell, where the electrode plate comprises the positive electrode and negative electrode plaited into an accordion form with separator therebetween, the exposed portion of metal foil must be provided at both ends of the positive electrode. In the case of the electrode group composed by alternately laminating a plurality of positive electrodes and negative electrodes with separators therebetween, one more negative electrode is used than positive electrodes. The negative electrodes are thus positioned at the outer sides, and two metal foils connected to the positive electrode collectors are disposed at the outer side as dummy plates, with a separator between each foil and the respective negative electrode. The outermost sides of the foil are also wrapped with separator. In this case, of course, the negative electrodes are connected electrically in parallel, and the positive electrode and dummy plates are connected electrically in parallel.

In the embodiment described herein, the active material was LiCoO2 in the positive electrode, and carbon in the negative electrode, but the invention is not limited to these systems alone. For example, as the positive active material, a double oxide of lithium and transition metal expressed as $LiMO_2$ or $LiM_2O_4$, where M is selected from the group consisting of Mn, Fe, Co, and Ni, may be used. As the negative active material, metallic lithium, Nb, Ti, and other transition metal oxides may be used as an alternative to carbon.

In the embodiment described herein, a microporous polypropylene membrane is used as the separator. Depending on the purpose, however, the membrane separator may be made of polyolefin such as polyethylene or mixture of polyethylene and polypropylene.

The non-aqueous electrolyte of the invention is not limited to the organic electrolyte. The technology may be sufficiently applied to polymer solid electrolyte, too.

What is claimed is:

1. A non-aqueous electrolyte secondary battery comprising:

an electrode group comprising:
a positive electrode and a negative electrode having a separator material sandwiched therebetween, said positive electrode comprising a first conductive metal foil portion comprising a coating of an active material or a mixture of an active material and a conductive agent, and
a second conductive metal foil portion electrically connected to said positive electrode,
wherein an outermost portion of the negative electrode is positioned outwardly of an outermost portion of the positive electrode, said second metal foil portion is positioned outwardly of the negative electrode outermost portion, and said separator material is positioned between the second metal foil portion and the negative electrode outermost portion and covers an outermost side of the second metal foil portion; and
a negative polarity cell container in which said electrode group is housed together with a non-aqueous electrolyte.

2. The non-aqueous electrolyte secondary battery according to claim 1, wherein:

the electrode group comprises said positive electrode and said negative electrode spirally coiled together with said separator material therebetween, wherein said second metal foil portion is electrically connected to an outer circumferential end of the positive electrode, the negative electrode outermost portion comprises a first outer circumference that is entirely covered with the second metal foil portion that comprises a second outer circumference, said separator material positioned between said first outer circumference and second outer circumference and covering said second outer circumference.

3. The non-aqueous electrolyte secondary battery according to claim 1, wherein said electrode group has an oval cross-section with said positive electrode, said negative electrode, and said separator material therebetween, configured in a flat plate in a central winding core; in which said second metal foil portion is electrically connected to an outer circumferential end of the positive electrode and wherein the negative polarity cell container has an oval geometry.

4. A non-aqueous electrolyte secondary battery of claim 1, wherein the first metal foil portion that comprises the positive electrode has an exposed portion thereof without said coating, said exposed portion defining said second metal foil portion.

5. The non-aqueous electrolyte secondary battery of claim 2, wherein the first metal foil portion that comprises the positive electrode collector has an exposed portion thereof without said coating, said exposed portion defining the second metal foil portion.

6. The non-aqueous electrolyte secondary battery of claim 3, wherein the first metal foil portion that comprises the positive electrode collector has an exposed portion thereof without said coating, said exposed portion defining the second metal foil portion.

7. The non-aqueous electrolyte secondary battery of claim 1, wherein said electrode group is adapted to fail upon application of a crushing force by at least one failure mode selected from the group consisting of:

the separator material on the outermost side of said second metal foil portion breaking first so that the second metal foil portion short-circuits with an inner wall of said cell container;

the separator material between said second metal foil portion and said negative electrode breaking first so that the second metal foil portion short-circuits with said negative electrode.

* * * * *